J. J. BEY.
MANURE LOADER.
APPLICATION FILED JULY 30, 1915.
1,180,757.
Patented Apr. 25, 1916.
2 SHEETS—SHEET 1.
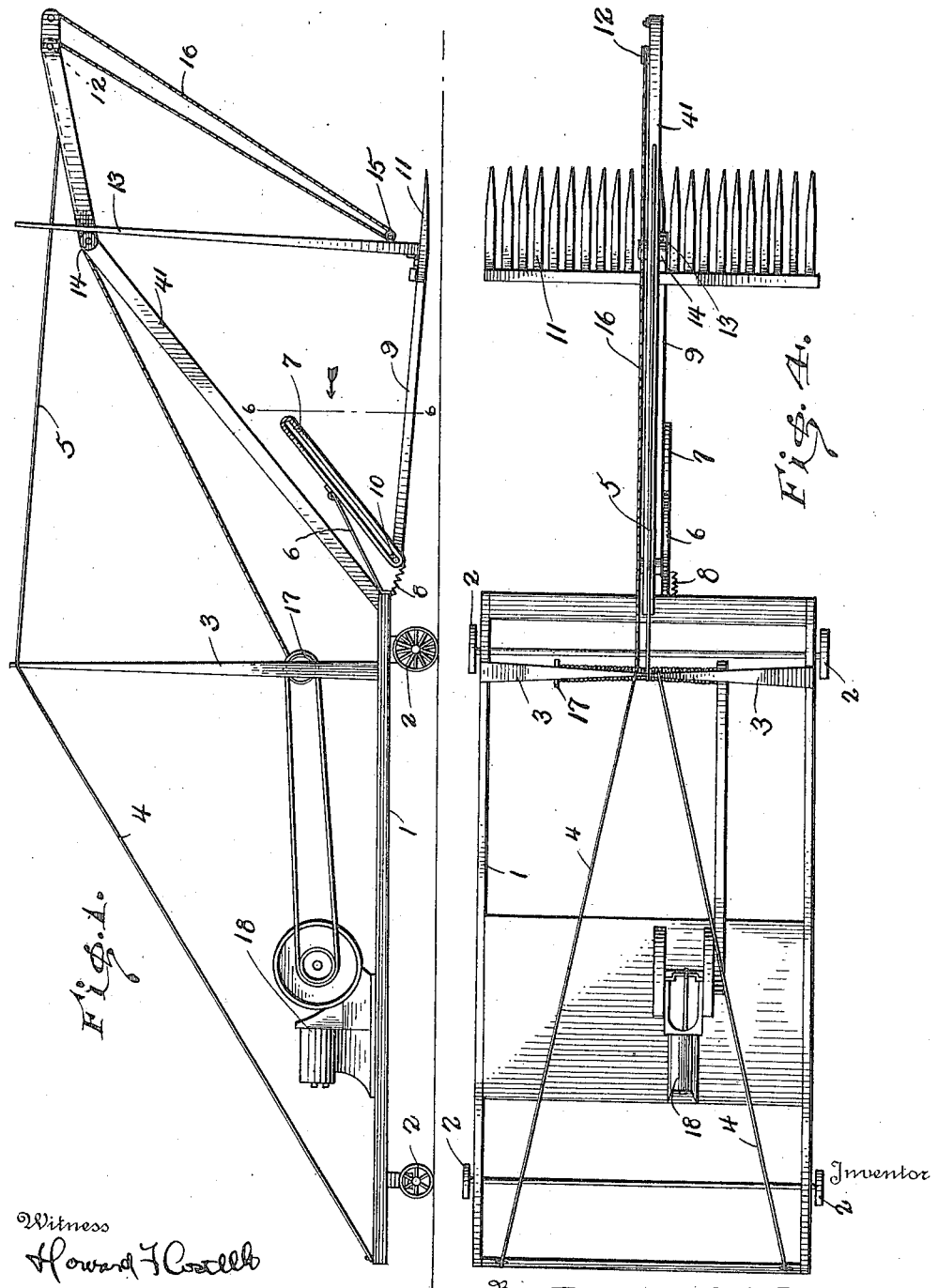
Witness
Howard F Costello
Inventor
J. J. Bey
By
Attorneys

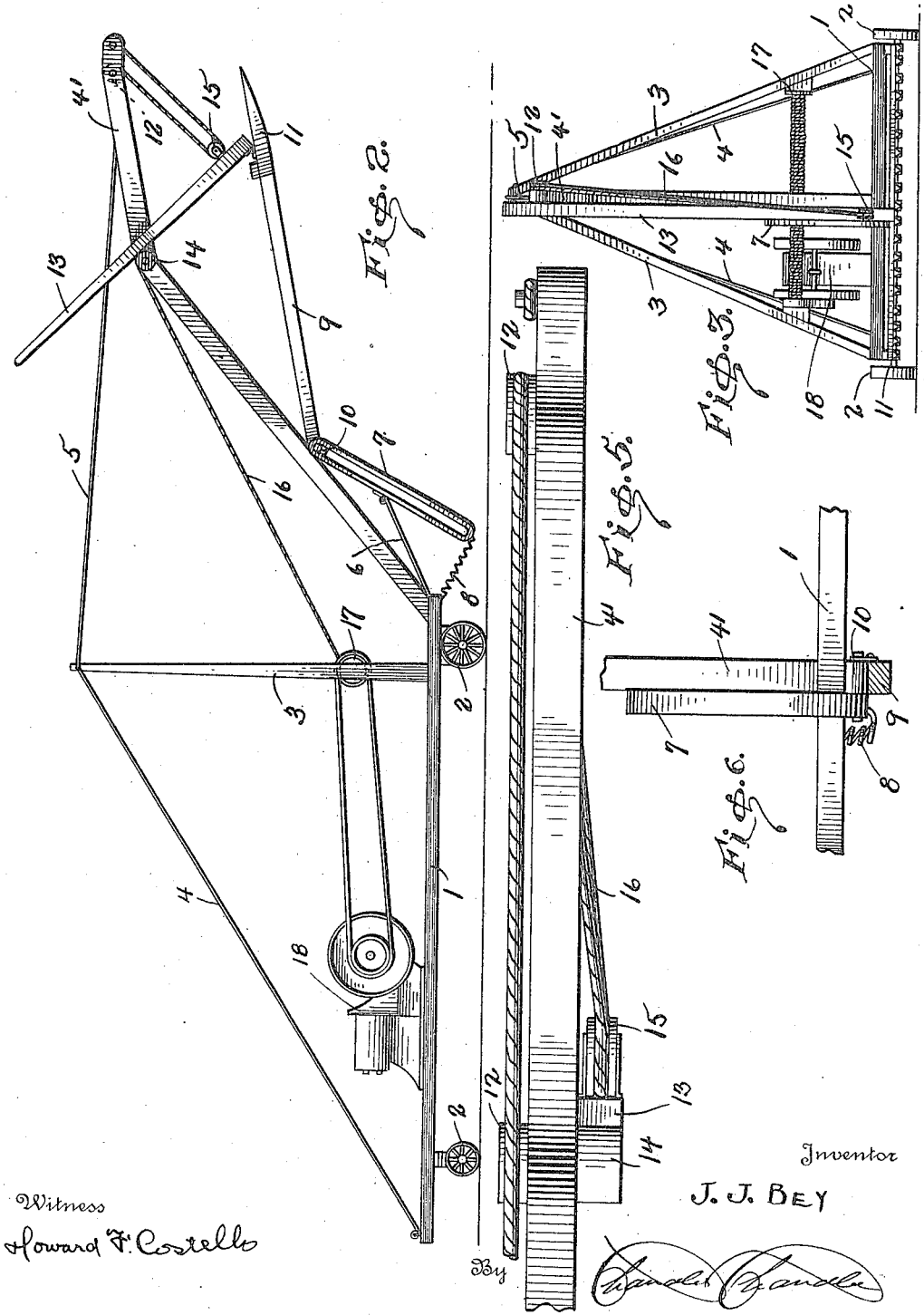

UNITED STATES PATENT OFFICE.

JULIUS J. BEY, OF DODGE CENTER, MINNESOTA.

MANURE-LOADER.

1,180,757.   Specification of Letters Patent.   Patented Apr. 25, 1916.

Application filed July 30, 1915. Serial No. 42,800.

*To all whom it may concern:*

Be it known that I, JULIUS J. BEY, a citizen of the United States, residing at Dodge Center, in the county of Dodge, State of Minnesota, have invented certain new and useful Improvements in Manure-Loaders; and I do hereby declare the following to be a full, clear, and exact description of the invention, such as will enable others skilled in the art to which it appertains to make and use the same.

This invention relates to a manure loader.

An object of the invention resides in the provision of a device by means of which hay or other similar material may be loaded into a wagon.

A further object of the invention resides in so constructing the device that it will be simple to operate and will be efficient in use.

With these and other objects in view, such as will appear as my description progresses, my invention comprises the combination and arrangement of parts as set forth in and falling within the scope of the appended claim.

In the drawing:—Figure 1 is a side elevation of my device showing the fork in its lowered position; Fig. 2 is a similar view showing the fork in its raised position; Fig. 3 is a front elevation; Fig. 4 is a plan view; Fig. 5 is a fragmental detail of the forward end of the boom, and Fig. 6 is a section on line 6—6 of Fig. 1.

Referring to the drawing by reference characters wherein like parts are indicated by like characters throughout the several views: In the embodiment of the invention shown in the drawing, I have provided a main frame 1 which is supported by suitable wheels 2. Mounted on one end of this frame is a pair of vertically extending upwardly converging standards 3 which meet at their upper ends and which are braced by means of guy rods 4 which extend downwardly and are secured to the frame 1.

Mounted on the forward end of the frame 1 is a boom 4' which extends upwardly and is braced by means of a guy rod 5 which is connected to the upper ends of the standards 3.

Extending forwardly from the frame 1 and located beneath the boom 4' is a bracket 6 on which a link 7 is mounted, the said link being mounted between its ends, pivotally. Secured to the lower end of the link is a coil spring 8 which is at its other end, secured to the frame 1.

A fork beam 9 is provided which has a roller 10 on one end thereof, which roller is slidably mounted in the link 7. On the other end of this beam is a fork 11. A pulley 12 is mounted on the extreme end of the boom 4'. Pivotally secured to the beam 9 adjacent the fork 12 is an upwardly extending beam 13 which rides upon a friction pulley 14 upon the boom 4'. A pulley 15 is secured to the lower end of this beam 13 and a cable 16 passes over these pulleys 12 and 15 and thence downwardly and around a windlass 17 which is mounted between the standards 3 and may be driven by a suitable engine 18 upon the frame 1.

The fork may be loaded when in the position shown in Fig. 1 of the drawing and at this time the roller 10 will be at the lower end of the link 7. After the fork has been loaded the windlass may be operated to raise the fork at which time the link 7 will move pivotally and the beam 13 will guide the fork. When the fork is in its raised position the roller 10 will be located at the upper end of the link 7 as illustrated in Fig. 2 of the drawing.

From the foregoing description it will be seen that I have provided a very simple and efficient manure loader which may be easily operated.

While I have illustrated and described a particular embodiment of my invention, it has merely been for the sake of convenience and I do not wish to be limited to that particular embodiment as it is obvious that numerous changes may be made within the scope of the appended claim.

What I claim is:—

In a manure loader, the combination with a wheel supported frame, of a boom mounted on one end thereof, a bracket extending forwardly from the frame, a link pivotally mounted on the bracket, a coil spring secured to the lower end of the link and to the frame and a fork supporting beam suspended from the said boom and having a roller slidably mounted in the said link.

In testimony whereof, I affix my signature, in the presence of two witnesses.

JULIUS J. BEY.

Witnesses:
E. B. BENSON,
M. D. WILLIAMS.

Copies of this patent may be obtained for five cents each, by addressing the "Commissioner of Patents, Washington, D. C."